Oct. 18, 1932.   H. H. HAGLUND   1,882,818
DIRECTION CONTROL SWITCH FOR TRANSMISSION OVER SUBMARINE CABLES
Filed Oct. 30, 1930   2 Sheets-Sheet 1
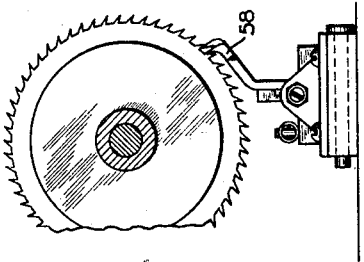
FIG. 6
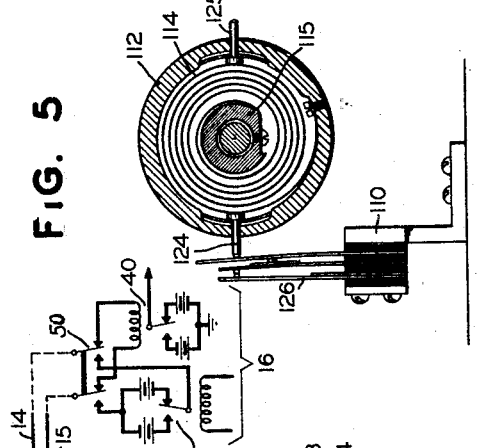
FIG. 5
FIG. 1
Inventor
H. H. HAGLUND
By his Attorney
Eugene C. Brown Oct. 18, 1932.   H. H. HAGLUND   1,882,818
DIRECTION CONTROL SWITCH FOR TRANSMISSION OVER SUBMARINE CABLES
Filed Oct. 30, 1930   2 Sheets-Sheet 2
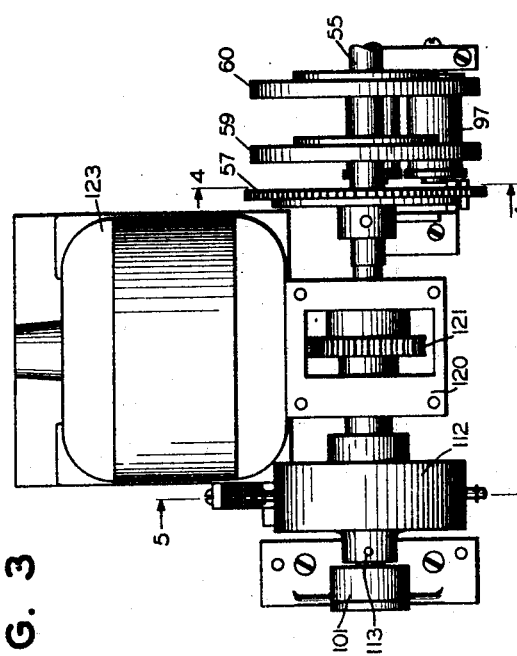
FIG. 4
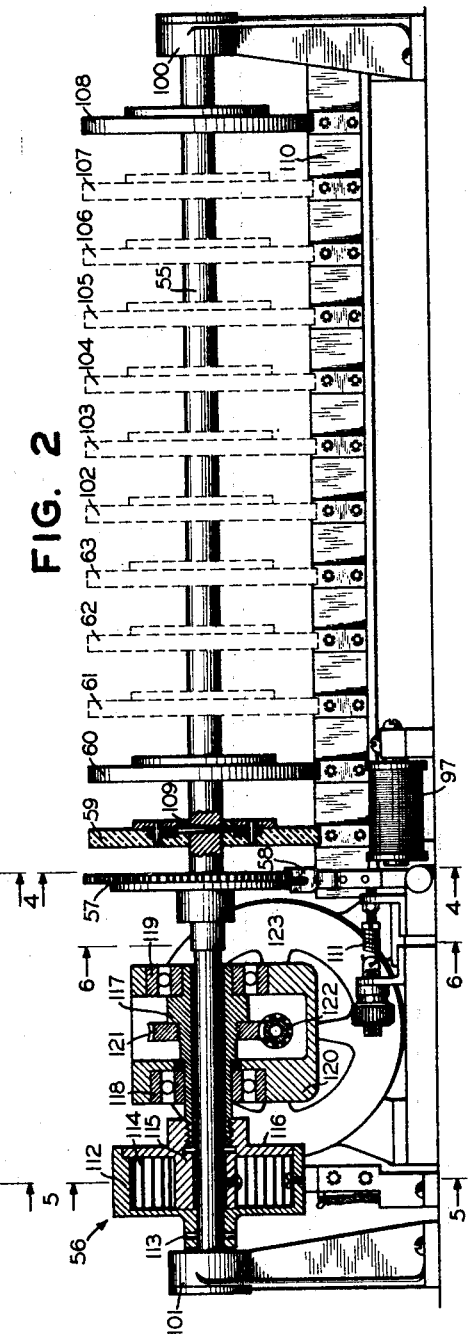
FIG. 2
FIG. 3
Inventor
H. H. HAGLUND
By his Attorney
Eugene C. Brown Patented Oct. 18, 1932

1,882,818

UNITED STATES PATENT OFFICE

HAKON H. HAGLUND, OF FLUSHING, NEW YORK, ASSIGNOR TO THE WESTERN UNION TELEGRAPH COMPANY, OF NEW YORK, N. Y., A CORPORATION OF NEW YORK

DIRECTION CONTROL SWITCH FOR TRANSMISSION OVER SUBMARINE CABLES

Application filed October 30, 1930. Serial No. 492,331.

This invention relates to automatic transmission over transmission lines and more particularly to mechanism for reversing the direction of signalling over submarine cables.

The present day developments in the field of loaded submarine cables, have made it possible to employ cables having electrical characteristics which permit of a speed of operation far in excess of any speed used heretofore over unloaded cables. At such high operating speeds difficulty is experienced however in constructing and adjusting an artificial line which will simulate the real cable with sufficient accuracy to permit duplex operation at the possible speeds of transmission over the cable and in some installations it has been the practice to operate the cable in one direction only at a time and to provide some means for automatically reversing the direction of transmission at frequent intervals.

In Patent #1,681,489 granted August 21, 1928, to Locke and Haglund, such a system for automatically reversing the direction of transmission over the cable at periodic intervals, by means of timing devices located at each station, is disclosed. In this patent, the reversing mechanism consists briefly of a series of switch actuating cams, driven by a friction clutch from an electric motor through an escapement mechanism. The timing device comprises a second series of switch operating cams, driven at different speeds through reduction gearing from the rotary distributor, the timing device serving to first complete a circuit, to start the driving motor of the reversing mechanism just prior to the time of reversing the direction of transmission, then to complete a pulsing circuit for the escapement magnet of the reversing mechanism at the exact predetermined switching time and finally to interrupt the motor circuit after the transmitting circuit connections have been reversed.

One of the objects of the present invention is to simplify the mechanism required for changing the direction of transmission over a submarine cable or other line and to render the operation of the direction changing mechanism more positive.

Another object is to provide a drive for the reversing mechanism which is independent of the timing mechanism.

Various other objects and advantages of the invention will appear from the following description taken in connection with the accompanying drawings in which:

Figure 1 is a diagrammatic view of a terminal station for a cable system, embodying the present invention;

Figure 2 is a side elevation partly in section of the mechanism for reversing the direction of transmission;

Figure 3 is a plan view of the driving means for the reversing mechanism;

Figure 4 is a sectional view on the line 4—4 of Figure 2;

Figure 5 is a vertical sectional view on the line 5—5 of Figure 2; and

Figure 6 is a sectional view on the line 6—6 of Figure 2.

Referring first to Figure 1, I have shown diagrammatically the reversing mechanism 10 and timing mechanism 11 associated with a receiving distributor 12 and transmitting distributor 13 which may be located at some distance from the shore and connected by a pair of land lines 14 and 15 to a repeater station 16 which may be located at a terminal of the cable.

The system shown may be arranged for two or more channel multiplex operation with automatic periodic reversals of the direction of transmission for all channels substantially simultaneously, only one channel, however, being shown.

At the transmitting station there is a line relay 17 for repeating impulses received from lines 14 and 15, a printer 18 of the usual type terminating the first signalling channel when the system is receiving and a perforated tape controlled transmitter 19 which may be of the type disclosed in patent to G. R. Benjamin, #1,298,440, granted March 25, 1919. The printers and transmitters for the other channels are omitted from the drawings. The printer 18 comprises five selecting magnets 20 and a printing or press magnet 21. The transmitter 19 comprises five transmitting contact tongues 22 movable between stationary front and back contacts connected to positive and negative battery, and a transmitter stepping magnet 23 for stepping the tape ahead during transmission.

The face of the receiving distributor 12 comprises a solid receiving ring 24, and a segmented receiving ring 25 for distributing impulses, received by the ring 24 from the relay 17, to the selecting magnets of the printers when the brush 26 passes over the solid and segmented rings. The receiving face, also comprises a solid local ring 27 and local segments 28 for controlling the press magnet 21 when the brush 29 moves over the local rings.

The rings of the distributor are shown developed in straight lines and of the receiving and sending segments only those corresponding to the first channel are shown.

The sending face of the distributor comprises a solid sending ring 30 for connection to the line 15 when the station is transmitting and a segmented ring 31 for connecting the transmitter contacts 22 to the ring 30 when the brush 32 moves over the transmitting rings. The sending face further comprises the local solid ring 33 and local segments 34 for controlling the stepping magnet 23 as the brush 35 passes over the local rings. The sending face also comprises motor control rings 36 and 37 and their brush 38 which supplies current alternations for controlling the speed of operation of the driving motor of the timing mechanism 11, in a manner explained hereinafter.

At the repeating station 16, there is a polarized pole changing relay 40 operating from the lines 14 and 15 into multiplex repeating equipment (not shown) for sending the signals out over the cable. A polarized transmitting relay 41 is also provided at the repeating station for relaying the signals received from the cable over the lines 14 and 15, to the receiving relay 17.

The mechanism 10 for controlling the direction of communication is shown in the position for transmission, switches 42, 43 and 44 being closed to the right and switch 45 being open. In this position the receiving relay 17 is disconnected from the lines 14 and 15 at the left hand contacts of the switch 44 and the circuit to the selecting magnet 20, from the receiving rings 24 and 25 is open at the switch 45. The receiving apparatus is therefore rendered inoperative. However a circuit is completed from ground through the switch 43, conductor 46, positive or negative batteries 47 or 48 and contacts 22 of the transmitter (set up in a particular code combination), segments 1 to 5 of ring 31, brush 32, ring 30, conductor 49, right hand contact of switch 44 to the line 15, thence through the right hand contacts of the switch 50 and winding of the relay 40 at station 16 and back by the line 14 and contact of switch 44 to the ground at 51. A circuit is also prepared for the stepping magnet 23, from battery 52, by conductor 53, switch 42 and conductor 54 to the local transmitting segments 34, brush 35, and solid ring 33 to ground.

As long as the cam shaft 55 of the reversing mechanism 10 remains in the position shown, transmission may continue. When it is desired to change the direction of communication, cam shaft 55 is caused to rotate 180°, reversing the connections through the switches 42 to 45 so as to disconnect the transmitting distributor 13 and to connect the receiving distributor 12 to the lines 14 and 15.

The shaft 55 is driven by a spring motor 56 through an escapement wheel 57 and an anchor 58. Cams 59, 60, 61, 62 and 63 are mounted upon the shaft 55 to rotate therewith. Cams 59 to 62 each have a single raised portion 64 co-operating with a cam follower forming an extension of one contact of the switches 42 to 45, and cam 63 has a pair of diametrically opposite recesses 65 co-operating with the extended follower arm of a swith 66. The cams are arranged in the relative angular positions shown in Figure 1.

With the cams reversed 180°, from the position shown in position for reception of signals from the repeating station, switches 42 and 43 will be open, switch 45 closed and switch 44 open at its right hand contacts and closed at its left hand contacts. In such position the circuit to the transmitter contacts 22 is open at switches 43 and 44 and the circuit for the tape stepping magnet 23 is open at switch 42. The transmitter is therefore rendered inoperative. A circuit is completed at the same time from positive or negative battery at the repeating relay 41, at station 16 through the relay tongue and switch 48 (which is closed against its left hand contacts at this time through a cam reversing switch similar to the reversing mechanism 10), the circuit then continuing by line conductor 14, left hand contact of switch 44, winding of relay 17 and back by way of switch 44 to the line 15. A circuit is also completed from the tongue of line relay 17, through ring 24, brush 26 and segments 25 of the receiving face plate, to the selecting magnets 20 and thence by conductor 67 to ground through the switch 45. The received apparatus is therefore placed in operative relation to the line.

The timing mechanism 11, which controls the operation of the reversing mechanism 10, comprises the cams 70, 71 and 72 for operating switches 73, 74 and 75 respectively, and gearing for operating the cams from a shaft 76 driven by a combination AC and DC motor 77 through a clutch 78. The clutch is normally held in engagement by a spring 79 although it is shown as held in disengaged position by a latch 80. The latch is controlled by a clutch releasing magnet 81 for starting the cams 70, 71 and 72 upon energization of the magnet. The clutch release magnet 81 is controlled through the distributor by a circuit not shown, so that the timing cams at all terminal and repeater stations may be started into operation simultaneously.

The alternating current side 82 of the motor 77 is supplied with alternating impulses from the secondary winding of a transformer 83, the primary winding of which has one terminal connected to the odd segments of the pulsing ring 37 and the opposite terminal connected to the even segments of ring 37. The solid ring 36 is connected to battery of one polarity and the mid-portion of the primary winding is connected to battery of the opposite polarity, whereby as the brush 38 sweeps over the rings 36 and 37, current alternations of a frequency having a definite relation to the speed of the rotary transmitter, will be induced in the secondary winding, for accurately controlling the speed of the motor 77. The direct current side of the motor is driven from a battery 85 through a resistance 86, the field winding 87 of the motor being connected in shunt to the battery.

The shaft 76 is driven at a speed directly related to the speed of the rotary transmitter. Through a gear train 88, the shaft 76 drives the cam 72, in a clockwise direction, at a predetermined speed which may for convenience be 4 R. P. M. The cams 70 and 71 are driven at a lower speed, which may be about $\frac{1}{12}$th R. P. M., by reduction gearing 89.

The cam 72 has a single depressed portion in its periphery and the cams 70 and 71 each have two depressed portions in their periphery, those in cam 71 being diametrically opposite each other and those in cam 70 being spaced apart 90°. The switches 73, 74 and 75 each have a cam follower which bear on the periphery of the cams 70, 71 and 72, respectively, the switches being closed when their respective cam followers are in a depression but being opened when the cam followers are on the raised portion of the cam peripheries.

With the clutch 78 engaged, switch 75 will be closed four times each minute, each period of closure lasting a few seconds, switch 74 will be closed once every six minutes, and switch 73 will close alternately at nine minute and three minute intervals. The specific form of cam 71 is intended to cause the system to reverse the direction of signalling over the cable circuit once every six minutes and the particular form of cam 70 permits the transmission in one direction for nine minutes and in the opposite direction for three minutes. Other cams not shown, which may be caused to function in place of the cams 70 or 71, may have other forms with depressed portions separated by raised portions to represent any suitable time period of traffic in either direction.

Manually operated cams 90 and 91, each having one-half of their periphery depressed, are provided to determine which of the cams 70 or 71 will be effective to control the period of reversal. With the cam 90 set in the position shown, the switch 73 is held open continuously and does not respond to the operation of the cam 70. Cam 91 however is set with the depressed portion opposite the end of the cam follower of the switch 74 thereby permitting the follower to drop into the depression in the cam 71 to close the switch 74 once every six minutes.

The relative angular positions of cams 70, 71 and 72 on their shafts is such that during each period of closure of switches 73 or 74 there will be a period in which the switch 75 is also closed or in other words a period of coincident closure of the switches 73 or 74 and switch 75.

A continuously running commutator drum 92 is provided on the motor shaft 76, having a 180° sector 93 insulated from the remainder of the drum, whereby as the drum revolves the brushes 94 and 95 will be bridged during each half revolution only. Brush 95 is connected to grounded battery 96 and brush 94 is connected to one terminal of the escapement magnet 97, the opposite terminal being connected, by a conductor 98 to one contact of the switches 73 and 74 in parallel. The opposite contacts of these switches are grounded through the switch 75, when this latter switch is closed. Consequently each time the switch 73 or 74 closes, the above traced circuit will be completed through the escapement magnet 97 causing stepping impulses to be supplied thereto through the commutator 92.

As soon as the cam shaft 55, of the reversing mechanism, advances one step, a locking circuit is completed for the escapement magnet at the switch 66, this switch being operated by the cam 63. Cam 63 has two short depressions at diametrically opposite points on its periphery and the switch 66 has a cam follower pressing on the cam and is maintained closed by the raised portion of the periphery, except when the cam follower is at one of the two depressed points. Upon establishment of the locking circuit for the escapement magnet, the escapement wheel continues to step irrespective of the position of the timing cams, by the impulses supplied by the commutator 92, until the shaft 55 has moved through 180° from its starting point at which time the escapement magnet and the shaft stop due to the opening of the switch 66. The angular position of the timing cams is such that the stepping circuit through these cams has opened while the shaft 55 was rotating through the 180°.

Having described the operation of the system with reference to the diagrammatic view, the specific construction of the reversing mechanism 10 will be described in connection with Figures 2 to 6.

The cam shaft 55 is mounted in end bearings 100 and 101, the cams 59 to 63 and additional cams 102 to 108, for controlling the reversal of transmission over additional channels, being pinned to the shaft 55 at 109. The switches 42, 43 etc. controlled by the cams are mounted on an angle bracket 110 extending transversely of the cams. The escapement wheel 57 is released by a double arm escapement lever 58 which rocks axially of the escapement wheel as the magnet 97 is energized and deenergized. Tension on the escapement magnet is controlled by an adjustable spring 111.

The spring motor 56 comprises a housing 112 pinned at 113 to the shaft 55. The outer end of the spring 114 is secured to the housing 112 and the inner end of the spring is anchored to a hub 115. The hub has an annular flange 116 serving to cover the open end of the housing. The hub 115 is threaded to a sleeve 117 adapted to rotate in bearings 118 and 119 in a gear housing 120. A gear 121 is rigidly secured to the sleeve 117 and meshes with a worm 122 on the shaft of a winding motor 123.

Pins 124 and 125 (Figure 5) extend outwardly through diametrically opposite sides of the housing 112 and when the shaft 55 is in the position of rest one of the pins, as 124, is disposed opposite a spring switch 126, the contacts of which are connected in series in the motor circuit (Figure 1). The switch 126 is normally biased open and the motor circuit is incompleted as long as the spring 114 is wound up sufficiently to withdraw the convolutions inwardly away from the pins 124 and 125. However, as soon as the spring becomes sufficiently unwound, the outer convolution engages the pins 124 and 125 pushing them outwardly so that switch 126 is closed by one of them, to complete the motor circuit, thereby rewinding the spring to a predetermined tension. In this matter the spring 114 automatically maintains itself wound and the driving mechanism is independent of the control of the timing mechanism, thereby reducing the number of cams heretofore required for the timing mechanism, for bringing the motor into and out of operation preceding and following the period of operation of the reversing mechanism.

No energy is lost as occurs in the operation of a friction clutch and the force of the spring is positively connected to the cam shaft so that as the escapement magnet release the cam shaft it will respond instantly to the motive power, thus eliminating the more sluggish action occurring when using a friction clutch drive, due to slippage of the clutch members.

It is obvious that numerous changes and modifications may be made in the construction of the mechanism described, without departing from the present invention, and therefore I do not desire to be limited to the exact details shown and described.

What I claim is:

1. The combination with a transmission line, of transmitting apparatus and receiving apparatus, means for periodically changing the electrical connections of said apparatus whereby transmission takes place first in one direction and then in the other, said means comprising a plurality of switches, individual cams for operating said switches, a spring motor having a positive driving connection with said cams for rotating the same, an escapement for permitting said motor to drive said cams and means for periodically actuating said escapement.

2. The combination with a transmission line, of transmitting apparatus and receiving apparatus, means for periodically changing the electrical connections of said apparatus whereby transmission takes place first in one direction and then in the other, said means comprising a plurality of switches, individual cams for operating said switches, a spring motor having a positive driving connection with said cams for rotating the same, an electric motor for winding said spring motor, an escapement for permitting said spring motor to drive said cams and a timing mechanism for periodically actuating said escapement.

3. The combination with a transmission line, of transmitting apparatus and receiving apparatus, means for periodically changing the electrical connections of said apparatus whereby transmission takes place first in one direction and then in the other direction over said line, said means comprising a plurality of rotary switches, a motor having a positive driving connection with said rotary switches for actuating the same, an escapement mechanism normally holding said motor at rest and means for periodically actuating the escapement mechanism to permit said motor to operate, whereby to reverse the position of said rotary switches.

4. The combination with a transmission line, of transmitting and receiving apparatus, means for periodically reversing the line connection with said transmitting and receiving apparatus whereby transmission takes place first in one direction and then in the other direction over said line, said means comprising a mechanically operated switch mechanism, a motor having a rigid connection to said switch mechanism, means normally holding said motor at rest with a constant torque applied to the switch mechanism and means for releasing said motor at predetermined periods to actuate said switch mechanism whereby to reverse the line connections to said transmitting and receiving apparatus.

5. The combination with a transmission line, of transmitting and receiving apparatus, means for periodically reversing the electrical connections of said apparatus whereby transmission takes place first in one direction and then in the other, said means comprising a rotary switch mechanism, means for applying a constant torque to said switch mechanism, means normally holding the switch mechanism stationary against said torque and means for intermittently releasing the holding means to permit the switch mechanism to be rotated in a step by step movement into a position for reversing the line connection with said transmitting and receiving apparatus.

In testimony whereof I affix my signature.

HAKON H. HAGLUND.